United States Patent [19]

White

[11] 4,060,514

[45] Nov. 29, 1977

[54] PROCESS FOR THE REDUCTION OF COLOR IN POLYPHENYLENE OXIDE RESINS

[75] Inventor: Dwain M. White, Schenectady, N.Y.

[73] Assignee: General Electric Company, Schenectady, N.Y.

[21] Appl. No.: 649,981

[22] Filed: Jan. 19, 1976

Related U.S. Application Data

[63] Continuation-in-part of Ser. No. 431,129, Jan. 7, 1974, abandoned.

[51] Int. Cl.$^2$ .............................................. C08G 65/44
[52] U.S. Cl. ................................................. 260/47 ET
[58] Field of Search ..................................... 260/47 ET

[56] References Cited

FOREIGN PATENT DOCUMENTS 7,106,869 2/1971 Japan.
7,124,144 7/1971 Japan.
6,704,682 6/1967 Netherlands.

OTHER PUBLICATIONS

Starks, J. Am. Chem. Soc., 93, pp. 195-199 (1971).
Chem. Abstr. 8th Coll. Ind. 10376s-10378s (1973).

*Primary Examiner*—Howard E. Schain
*Attorney, Agent, or Firm*—F. Wesley Turner; Joseph T. Cohen; Jerome C. Squillaro

[57] ABSTRACT

A process for the reduction in the color of polyphenylene oxide resins comprising contacting the oxide resin with a phase transfer agent and a dithionite or a thiosulfate reducing agent. The resulting polyphenylene oxide resins which are substantially free of color can be used to prepare improved molded, calendered, or extruded articles, films, coatings, threads, filaments, tapes and the like.

14 Claims, No Drawings

PROCESS FOR THE REDUCTION OF COLOR IN POLYPHENYLENE OXIDE RESINS

This is a continuation-in-part of application Ser. No. 431,129, filed Jan. 7, 1974, now abandoned.

The process of this invention relates to reducing the color of polyphenylene oxide resins by contacting the resins with a phase transfer agent and a dithionite or a thiosulfate reducing agent.

The esthetic effects associated with the color of articles of manufacture prepared from polymeric materials is well-known to those skilled in the art. Accordingly, during the economic life span of most, if not all, polymeric materials, the color characteristics of the material becomes exceedingly important to its marketability under highly competitive conditions with other types of polymeric materials as well as with similar polymeric materials manufactured by others. Accordingly, effective means for reducing the color of polyphenylene oxide resins are of continuing interest to those skilled in the art.

It is an object of this invention to provide polyphenylene oxide resins which have improved color characteristics. Another object is to improve the color of the polymer per se by removing or reducing the occurrence of polymer skeletal spatial relationships which impart color characteristics to polyphenylene oxides by the selective absorption of various portions in the visible light region. Another object is to chemically reduce color absorbing polymeric structural entities so that the light transmitted by the polymer in the visible range is essentially colorless. Another object is to prepare polymers which do not absorb light in the visible region and as a consequence appear to be colorless. Another object is to prepare polyphenylene oxide resins that absorb only in the ultraviolet light range. Still another object is to render colorless impurities associated with polyphenylene oxide resins in order that the resins do not have to be separated from such impurities in order to provide resins having the desired color characteristics. Still another object is to improve the effective yield of polyphenylene oxide resins by eliminating the necessity of removing undesirable colored dimers, trimers and low-molecular-weight oligomer by-products from the polyphenylene oxide resins and essentially converting 100 percent of feedstock to an uncolored polyphenylene oxide resin form suitable for commercial utilization. These and other objects will be readily apparent from the following specification and the appended claims.

In essence, my inventive process comprises the contact of a polyphenylene oxide with a phase transfer agent and a dithionite or a thiosulfate reducing agent in order to improve the color characteristics of polyphenylene oxide.

The polyphenylene oxides which are employed in my process comprise any of the polyphenylene oxides, which are also known as poly(oxyphenylenes) or poly(-phenylene ethers), known to those skilled in the art which can be derived from polymerization of phenols prepared by any of the methods wellknown to those skilled in the art including those described in the A. S. Hay, U.S. Pat. No. 3,306,875, among others. In general, the process of preparing polyphenylene oxide as reported by Hay can be summarized according to the following equation:

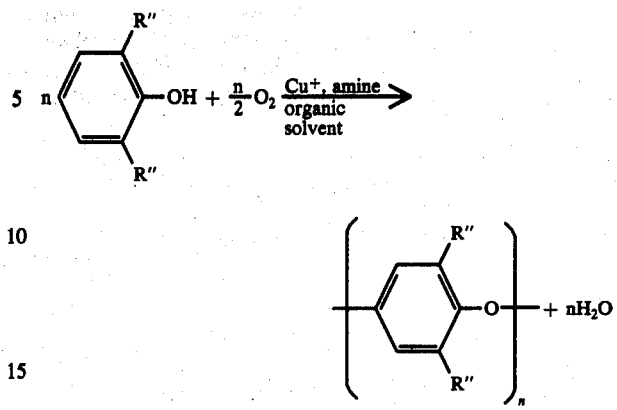

wherein each R" is hydrogen, hydrocarbon radical, halohydrocarbon radical, hydrocarbonoxy radical or halohydrocarbonoxy radical, and $n$ is a positive integer of at least 10. As illustrated by the above equation, polyphenylene oxide reaction mixtures comprise a polyphenylene oxide organic phase and an aqueous phase derived from the elimination of water during the polymerization process. In general, the organic phase of the reaction mixture described by the above equation comprises any unreacted disubstituted phenolic compound, polyphenylene oxide, solvent, unconsumed cupric salt catalyst complex, catalyst residue, as well as dimers, trimer, tetramers, etc., and low molecular weight oligomers of disubstituted phenol reactants. The aqueous phase contains trace amounts of amine, unreacted phenolic monomer, as well as quinones, such as disubstituted benzoquinone.

The polyphenylene oxide contained within the organic phase can be separated or precipitated from the reaction solvent by the addition thereto of suitable amounts of low molecular weight aliphatic alcohols, ketones, esters, ethers, hydrocarbons or olefins, etc.

The polyphenylene oxide resin and any other color bodies contained within the polyphenylene oxide resin can be contacted by the phase transfer agent by introducing the phase transfer agent to the reaction mixture, either before, during, or after polymerization of a disubstituted phenol to a polyphenylene oxide. In one embodiment of this invention, upon precipitation of polyphenylene oxide from the reaction mixture, the polyphenylene oxide can be redissolved in a suitable solvent such as toluene, benzene, chlorobenzene, dichlorobenzene and, thereafter, can be contacted with any phase transfer agent, preferably a phase transfer agent selected from the preferred group defined elsewhere herein, and a dithionite or a thiosulfate reducing agent. Other embodiments include addition of the phase transfer agent either before or during polymerization of the polyphenylene oxide, coupled with the subsequent addition after completion — or substantive completion — of the polymerization reaction of an aqueous phase soluble dithionite or thiosulfate reducing agent to an aqueous phase of the reaction mixture.

Any of the well-known phase transfer agents that are soluble in the organic solvent(s) — commonly employed in the preparation of polyphenylene oxides by methods well known to those skilled in the art — can be employed in my invention.

Illustrative of generally preferred phase transfer agents that can be employed comprise any organo phase soluble compounds selected from the group consisting of quaternary ammonium compounds, quaternary phosphonium compounds and tertiary sulfonium compounds, or mixtures thereof. Presently preferred phase transfer agents include ammonium, phosphonium and sulfonium salts represented by the following formulas, respectively:

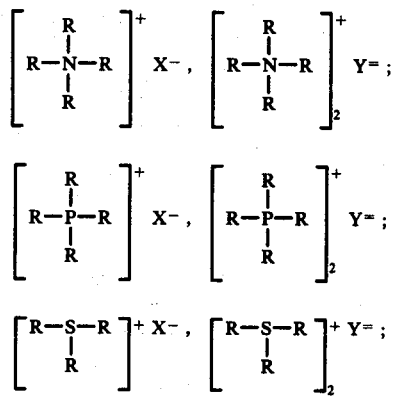

wherein each R is independently selected from aliphatic hydrocarbon radicals having from about 1 to about 30 carbon atoms, preferably from about 2 to about 15 carbon atoms, each X$^-$ is selected from the group consisting of Cl$^-$, Br$^-$, F$^-$, CH$_3$SO$_3^-$, CH$_3$CO$_2^-$, CF$_3$CO$_2^-$ or OH$^-$, and each Y$^=$ is selected from the group consisting of SO$_4^=$, CO$_3^=$, or C$_2$O$_4^=$. Illustrative examples of presently preferred phase transfer agents follow:

tetramethylammonium chloride,
tetraethylphosphonium iodide,
tripropylsulfonium bromide,
tetrabutylammonium fluoride,
tetrapentylphosphonium hydroxide,
triheptylsulfonium acetate,
tricaprylmonomethylammonium chloride,
tetradodecylphosphonium trifluoroacetate,
trioctadecylsulfonium sulfate,
tetraeicosylammonium carbonate,
tetratricosylphosphonium oxalate,
tritriacontylsulfonium methane sulfonate, etc.

The onium compounds can be prepared by methods well known in the art which include the familiar addition reactions of tertiary aliphatic amines, tertiary aliphatic phosphines and aliphatic sulfides with aliphatic halides.

The dithionite or thiosulfate reducing agent can be any aqueous phase soluble dithionite or thiosulfate reducing agent. Illustrative of generally preferred reducing agents that can be employed comprise any inorganic ammonium, alkali metal Periodic Table Group IA, alkaline earth Periodic Table Group IIA, or Periodic Table Group IIB salts of dithionous and thiosulfuric acids or mixtures thereof. The anionic substituent associated with the aforesaid reducing agents can be represented by the following formulas, respectively: [S$_2$O$_4$]$^=$ and [S$_2$O$_3$]$^=$.

Illustrative examples of presently preferred inorganic reducing agents follow:
ammonium dithionite,
lithium dithionite,
sodium dithionite,
potassium dithionite,
rubidium dithionite,
cesium dithionite,
beryllium dithionite,
magnesium dithionite,
calcium dithionite,
strontium dithionite,
barium dithionite,
zinc dithionite,
cadmium dithionite,
ammonium thiosulfate,
lithium thiosulfate,
sodium thiosulfate,
potassium thiosulfate,
rubidium thiosulfate,
cesium thiosulfate,
beryllium thiosulfate,
magnesium thiosulfate,
calcium thiosulfate,
strontium thiosulfate,
barium thiosulfate,
zinc thiosulfate,
cadmium thiosulfate, etc.,
and mixtures thereof.

A presently more preferred group of reducing agents comprise dithionite reducing agents since the use of members of this group requires less reaction time than thiosulfate reducing agents in the reduction or elimination of color from polyphenylene oxide reaction mixtures or polyphenylene oxide resins.

In general, the process can be carried out within a temperature range of from about minus 50° C. to about plus 200° C., preferably from 0° C. to about 100° C., and more preferably from about 10° to about 50° C. since a narrow temperature range provides reaction conditions which improve the efficiency of the process in the reduction of the color absorbing entities contained by polyphenylene oxide skeletal structures as well as byproduct dimers, trimers, tetramers and low-molecular-weight oligomers formed during the preparation of the polyphenylene oxide.

The amount of phase transfer agent and reducing agent employed can be any amount which reduces the color of polyphenylene oxide to a level which is less than the visible light transmittance range of polyphenylene oxide as prepared in the absence of the agents. In general, colored polyphenylene oxide resins and by-products impurities contained therein absorb visible light within the range of from about 4,000 to about 5,000 Angstrom units. When substantially colorless polyphenylene oxide product is desired, it is preferred that a sufficient amount — generally at least stoichiometric molar equivalent amounts — be present in order to substantially reduce to hydroxyl groups all of the carbonyl groups associated with the polyphenylene oxide resins as well as any carbonyl groups associated with dimeric or other low-molecular-weight oligomers of any oxidatively coupled phenol reactants. Generally useful molar proportion of phase transfer agent to reducing agent to phenolic reactant molar are within the range of from about .00001:0.001:1 or lower to about 1:1:1 or higher. It is presently preferred that the phase transfer agent to reducing agent to phenolic reactant proportions be within the range of from about 0.002:0.002:1 to about 0.1:0.1:1.

The contact time required between the polyphenylene oxide, the phase transfer agent and the reducing agent which will provide the desired color change can readily be determined by those skilled in the art by the practice of this invention without undue experimentation. Generally, however, the contact time can be as low as 1 second or even less or as high as 24 hours, or even more. In general, where a minimum reaction time period is of the essence for economic or other considerations, dithionite reducing agents should be employed since this class of reducing agents, comparatively, reduces polyphenylene oxide color in time periods measured in seconds as opposed to hours wherein thiosulfate reducing agents are employed.

In order that those skilled in the art may better understand the invention, the following examples are given which are illustrative of the practice of the invention, however, are not intended for the purposes of limitation. In all the examples, all parts are by weight unless otherwise stated.

EXAMPLE I

A solution of 2,6-xylenol was polymerized to polyphenylene oxide in accordance with the following procedure: cupric bromide, N,N'-ditertiarybutylethylenediamine, dimethylbutyl amine tricaprylylmonomethylammonium chloride obtained from General Mills Company, Chemical Division, Kankakee, Illinois, 2,6-xylenol in the molar proportions 1:1:12:8:400 were contacted in a toluene solution containing 1% methanol by weight based on toluene. Oxygen was bubbled through the solution for a period of 30 minutes during which time the temperature rose from 25° to 30° C. The polymerization reaction was terminated by adding one mole of ethylenediaminetetraacetate (EDTA) per mole of copper in a 10% sodium hydroxide solution. 0.083 gram of sodium dithionite and 0.2 ml. of water were added for each gram of polyphenylene oxide contained within the reaction product based upon the assumption that 98% of the 2,6-xylenol was converted to polyphenylene oxide. A rapid discoloration of the reaction product mixture occurred. Five volumes of methanol containing 1% hydrochloric acid was added dropwise to the reaction mixture. The precipitated polymer was filtered and washed with methanol (10 ml. $CH_3OH$ per gram of polyphenylene oxide) yielding a white non-discolored white polymeric solid. An infrared spectrum of the polymer in carbondisulfide (2.5% concentration, 1 cm. cell) at 3610 $cm^{-1}$ showed a peak with an absorbance of 0.158 while the visible spectrum of the polymer in benzene (0.1% concentration, 1 cm. cell) had an absorbance at 422 mm. of 0.03). A portion of the polymer which was not contacted by the reaction product of tricaprylmonomethylammonium chloride and sodium dithionite had an infrared spectrum absorbance at 3610 $cm^{-1}$ of 0.148, a visible spectrum absorbance at 422 mm. of 0.12, and displayed a pale yellow color.

EXAMPLE II

Various combinations of reducing agents and phase transfer agent and the degree of effectiveness of the combinations in reducing the color of polyphenylene oxide reaction mixtures and polymers were determined in accordance with the following procedure: saturated solutions of tetramethyldiphenoquinone (TMDQ) in toluene at 25° C. (calculated 0.1% TMDQ in toluene by weight) were treated with an inorganic reducing agent (calculated 0.05 gram per 10 milliliters of TMDQ solution), 0.1 gram of tricaprylmonomethylammonium chloride and 1 milliliter of water. As a control similar saturated solutions were prepared with the exception that no tricaprylmonomethylammonium chloride was added. Set out hereinafter in Table I is the discoloration time associated with the use of various ionic reducing agents tested in the absence of phase transfer agent (control) and in the presence of a phase transfer agent (Aliquat 336®, i.e., tricaprylylmethylammonium chloride).

TABLE I

| | Color Reduction of TMDQ | |
|---|---|---|
| | Decoloration Time | |
| Reducing Agent | Control | Aliquat 336® |
| $Na_2S_2O_4$ | 15 min. | 10 sec. |
| $Na_2S_2O_3$ | No reaction | ca. 8 hrs. |
| NaSH | No reaction | No reaction |
| $NaHSO_3$ | No reacton | No reaction |
| $NaBH_4$ | No reaction | ca. 15 hrs. |
| $ZnS_2O_4/H^+$(trace) | ca. 8 hrs. | 2 min. |

The reducing agents tested in this example in the color reduction of tetramethyldiphenoquinone are equally effective when employed in conjunction with a phase transfer agent in the color reduction of polyphenylene oxide or polyphenylene oxide reaction mixtures.

As illustrated by the Table I data, a dithionite reducing agent - phase transfer agent combination is the most effective and most rapid, the thiosulfate reducing agent - phase transfer agent combination is the next most effective and next most rapid, and the borohydride reducing agent - phase transfer agent combination is the least effective and slowest decolorizing agent combination for tetramethyldiphenoquinone.

Analogous results are obtained when Aliquat 336® of this example is replaced by other commercially available phase transfer agents, e.g. n-hexadecyltrimethylammonium chloride (Eastman Chemical), Ethyl quat 0/12®, i.e. a quaternary amine containing polyethylene oxide substituents (Armour), Aliquat 726®, i.e. N-tallow-N,N,N', N', N'-pentamethyl-1,3-propylene diammonium dichloride (General Mills), crown ether, i.e., dicyclohexyl-18-crown-6 (Aldrich Chemical), as well as other General Electric laboratory prepared species, such as N,N'-dioctadecyl-N,N,N',N'-tetramethylethylene, diammonium dichloride, etc.

EXAMPLE III

Sodium dithionite was added to a polyphenylene oxide polymerization mixture which contained a trace of tricaprylylmonomethylammonium chloride (1% by weight based on the weight of the polymer). The mixture was heated to redistribute reduction products with polymer. After precipitation with methanol and drying, a white, solid polyphenylene oxide polymer was obtained which contained an enhanced (by approximately 7%) phenolic hydroxyl content, due to the retention of some of the quinone-type carbonyl groups which had been reduced to phenolic hydroxyl groups.

EXAMPLE IV

A solution of 2,6-xylenol was polymerized in accordance with the procedure set out in Example I. Following the 30-minute polymerization period, 0.0075 ml. of a 40% aqueous solution of tetrabutylphosphonium hydroxide, 0.083 g. sodium dithionite and 0.2 ml. water were added per gram of polyphenylene oxide. A rapid discoloration of the reaction mixture occurred. The polymer was precipitated with methanol, washed with methanol and dried yielding a white, nondiscolored solid polyphenylene oxide.

EXAMPLE V

A polymerization reaction was carried out in accordance with the procedure set out in Example I except the addition of EDTA was omitted and a portion of the polymer was isolated before contact with sodium dithionite. The modification of the procedure of Example I was carried out in order to allow "total isolation" of the reaction products. This isolation procedure was carried out by the dropwise addition of the reaction mixture to a rapidly stirred, vigorously boiling water (200 ml. of $H_2O$ per g. of polyphenylene oxide). The fibrous polymer was collected on a filter and dried at 60° C. in a vacuum. The polymer sample portion which was not contacted with the in situ prepared tricaprylylmonoethylammonium dithionite was bright yellow and had a visible spectrum absorbance at 422 mm. (0.1% polymer in benzene) of 1.8, while the polymer sample portion which was contacted tricaprylylmonoethylammonium dithionite combination had a visible spectrum absorbance of 0.14.

EXAMPLE VI 1.0 g. of sodium dithionite was added to a mixture of 10 ml. of water and 1.0 g. n-decyltrimethylphosphonium bromide dissolved in 100 ml. of benzene contained in a separatory funnel. The resulting admixture was vigorously shaken. After standing, two-phases, i.e., an organic and an aqueous, phase, had separated. The aqueous layer was drawn off and the organic benzene layer was washed with water. A small portion of the benzene layer was added to a benzene solution of tetramethyldiphenoquinone (TMDQ) and a rapid color reduction of diphenoquinone was observed. Evaporation of the benzene from the resulting decolored TMDQ benzene layer with a rotary evaporator left an oily concentrate (1.1 g.) which when redissolved in another benzene sample rapidly reduced another benzene solution of TMDQ. However, after standing at 25° C. for 2 hours, the redissolved oily concentrate no longer was able to reduce tetramethyldiphenoquinone solution.

Based on the data of the foregoing examples — in theory, not limiting upon the scope of the invention — the effective reducing agent can be any water soluble reducing agent which contains a dithionite or thiosulfate anion, the cation can be any cation that the reduction in color is not related to the presence of any specific cation species, and that the contact of the polyphenylene oxide with a phase transfer agent and a reducing agent is preferably carried out in the presence of a hydrolyzing agent, e.g. water, or aqueous solution of acids or bases.

Obviously, other modifications and variations for the present invention are possible in the light of the above teachings. It is, therefore, understood that changes may be made in the particular embodiments of the invention described which are within the full intended scope of the invention as defined by the appended claims.

I claim:

1. The process comprising contacting polyphenylene oxide with a phase transfer agent having a cation portion selected from the group consisting of quaternary ammonium, quaternary phosphonium, and tertiary sulfonium ions or mixtures thereof and a reducing agent having an anion portion selected from the group consisting of a dithionite $[S_2O_4]^=$ ion, a dithiosulfate $[S_2O_6]^=$ ion, or mixtures thereof.

2. The process comprising contacting polyphenylene oxide with a phase transfer agent having a cation portion selected from the group consisting of quaternary ammonium, quaternary phosphonium, and tertiary sulfonium ions or mixtures thereof and a reducing agent having an anion portion selected from the group consisting of a dithinite $[S_2O_4]^=$ ion, a dithiosulfate $[S_2O_6]^=$ ion, or mixtures thereof, said contacting being carried out at a temperature lower than 100° C. and in the presence of a hydrogen donor.

3. A claim 2 process, wherein said temperature is within the range of from about 10° to about 50° C. and wherein said donor is selected from the class consisting of aqueous solutions of weak acids and weak bases.

4. The claim 3 process, wherein said process is carried out in the presence of an effective organic phase reducing agent selected from the class consisting of quaternary ammonium, quaternary phosphonium and tertiary sulfonium salts of the formulas:

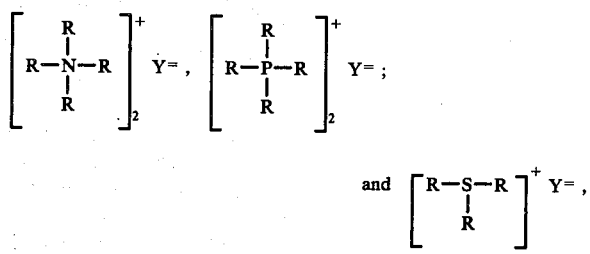

wherein each R is independently selected from aliphatic hydrocarbon and oxyhydrocarbon radicals having from 1 to about 30 carbon atoms, and wherein each $Y^=$ is independently selected from the group consisting of a dithionite $[S_2O_4]^=$ ion and a dithiosulfate $[S_2O_6]^=$ ion or mixtures thereof.

5. A claim 3 process, wherein the polyphenylene oxide is formed in the presence of a phase transfer agent selected from quaternary ammonium, quaternary phosphonium, or tertiary sulfonium compounds and mixtures thereof, said polyphenylene oxide being formed from the polymerization of a phenolic monomer of the formula:

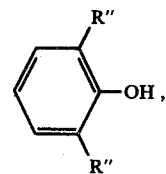

wherein each R" is hydrogen, a hydrocarbon radical, a halohydrocarbon radical, a hydrocarbonoxy radical or a halohydrocarbonoxy radical, thereafter adding to the resulting reaction mixture a reducing agent having an anionic substituent selected from the class consisting of dithionite $[S_2O_4]^=$ ions and dithiosulfate $[S_2O_6]^=$ ions.

6. A claim 4 process, wherein said R" is a hydrocarbon radical, and said anion portion is a dithionite $[S_2O_4]^=$ ion.

7. A claim 4 process, wherein said R" is a hydrocarbon radical, and said anion portion is a dithiosulfate $[S_2O_6]^=$ ion.

8. A claim 6 process, wherein each R" is a methyl radical.

9. A claim 7 process, wherein each R" is a methyl radical.

10. A claim 8 process, wherein said reducing agent is tricaprylylmonomethylammonium dithionite.

11. A claim 9 process, wherein said phase transfer agent is tricaprylylmonomethylammonium chloride.

12. A claim 2 process, wherein at least a portion of the percentage transmittance of the polyphenylene oxide in Angstrom wave length units is within the range of from about 4,000 to about 5,000 and is decreased as a result of said contacting.

13. A claim 12 process, wherein at least a major portion of the percentage transmittance of the polyphenylene oxide in said wave length range is decreased as a result of said contacting.

14. A claim 2 process, wherein the polyphenylene oxide is contained within a polyphenylene oxide reaction mixture.

* * * * *